US012137335B2

(12) United States Patent
Zoepf et al.

(10) Patent No.: US 12,137,335 B2
(45) Date of Patent: Nov. 5, 2024

(54) METHOD FOR NAVIGATING MULTIDIMENSIONAL SPACE USING SOUND

(71) Applicants: Stephen M. Zoepf, Redwood City, CA (US); Ryan McGee, Marina Del Rey, CA (US)

(72) Inventors: Stephen M. Zoepf, Redwood City, CA (US); Ryan McGee, Marina Del Rey, CA (US)

(73) Assignee: DZCO INC, Redwood City, CA (US)

( * ) Notice: Subject to any disclaimer, the term of this patent is extended or adjusted under 35 U.S.C. 154(b) by 193 days.

(21) Appl. No.: 17/891,427

(22) Filed: Aug. 19, 2022

(65) Prior Publication Data

US 2024/0080638 A1 Mar. 7, 2024

(51) Int. Cl.
*H04S 7/00* (2006.01)

(52) U.S. Cl.
CPC .......... *H04S 7/303* (2013.01); *H04S 2400/11* (2013.01); *H04S 2420/01* (2013.01)

(58) Field of Classification Search
CPC ............ H04S 2400/11; H04S 2400/15; H04S 2420/01; H04S 7/303; H04R 2420/01; H04R 2430/20; H04R 2460/07; H04R 25/558; G06F 3/165; G06F 3/167
USPC .... 381/1, 310, 309, 61, 74, 98, 306, 58, 17, 381/11, 10
See application file for complete search history.

(56) References Cited

U.S. PATENT DOCUMENTS

| | | | | |
|---|---|---|---|---|
| 8,923,995 B2 | 12/2014 | Lindahl et al. | | |
| 9,560,467 B2 | 1/2017 | Gorzel et al. | | |
| 2012/0165964 A1* | 6/2012 | Flaks | G06F 3/165 700/94 | |
| 2017/0188168 A1* | 6/2017 | Lyren | H04S 7/302 | |
| 2019/0149937 A1* | 5/2019 | Norris | H04S 7/40 700/94 | |
| 2020/0077220 A1 | 3/2020 | Sandler et al. | | |
| 2020/0278828 A1* | 9/2020 | Murtaza | G02B 27/0179 | |
| 2022/0377490 A1* | 11/2022 | Munoz | G06F 3/011 | |

OTHER PUBLICATIONS

Hiipakka et al., "A Spatial Audio User Interface for Generating Music Playlists", Proceedings of the 2003 International Conference on Auditory Display, Boston, MA, USA, Jul. 6-9, 2003, pp. ICAD03-267-ICAD03-270.
Schedl et al., "Large-Scale Music Exploration in Hierarchically Organized Landscapes Using Prototypicality Information", 7 pages.

* cited by examiner

*Primary Examiner* — Norman Yu
(74) *Attorney, Agent, or Firm* — F. CHAU & ASSOCIATES, LLC

(57) ABSTRACT

Systems and methods for navigating a virtual space using sound are described. Some examples include a multidimensional sound space with a plurality of nodes associated with a plurality of audio sources. Some examples of the system and methods include receiving a first user navigational input, determining a first user location in the multidimensional sound space, and playing a binaural sound associated with a node based on the first user location and the node's location. Some examples further include receiving a second user navigational input, determining a second user location in the multidimensional sound space, and playing a stereophonic sound associated with the node based on the second user location and the node's location.

17 Claims, 11 Drawing Sheets

METHOD FOR NAVIGATING MULTIDIMENSIONAL SPACE USING SOUND

BACKGROUND

The following relates generally to navigating a virtual space, and more specifically to navigating a multidimensional sound space.

Many electronic devices provide a graphical user interface to facilitate information transfer between a user and the device. The information can include media for the user to consume, such as songs, movies, images, and sounds. Typically, users navigate menus to reach the desired media. These menus can include multi-layered hierarchies and arrangements. These arrangements can correspond to the structure of a file system, for example.

However, in graphical user interfaces, a user may need to have prior knowledge to properly interpret the menus. For example, a user may need to have contextual knowledge to understand the labels contained in the menus. Further, it can be inefficient to search large spaces of data, such as music, by using one dimensional navigation such as scrolling through a list. Accordingly, there is a need in the art for methods to navigate sounds in a multidimensional space without necessarily relying on the use of labels.

SUMMARY

The present disclosure describes systems and methods for navigating a multidimensional sound space. Some embodiments of the method include receiving a user input, determining a user location in the multidimensional sound space based on the user input, and determining a distance between the location and one or more audio nodes. In some embodiments, a system generates stereo and binaural audio based on the user's location, the distances between the nodes, and audio sources associated with the nodes. In at least one embodiment, the audio is further processed based on an orientation of the user in the multidimensional sound space.

In some aspects, the system arranges nodes in the multidimensional sound space based on features of the audio sources associated with the nodes. In some embodiments, the features of the audio sources are based on audio data of the audio sources. In some embodiments, the features are based on metadata, such as user preferences, artists, albums, and the like. In some cases, the system aggregates additional metadata for the audio sources based on the user's activity in the multidimensional sound space.

A method, apparatus, non-transitory computer readable medium, and system for navigating a multidimensional sound space are described. One or more aspects of the method, apparatus, non-transitory computer readable medium, and system include receiving a first user input, wherein the first user input comprises a navigational input of a user with respect to a multidimensional sound space, and wherein the multidimensional sound space includes a plurality of nodes associated with a plurality of audio sources, respectively; determining a first user location in the multidimensional sound space based on the first user input; playing a binaural sound associated with a first node based on the first user location, a first node location of the first node, and a stereo transition threshold; receiving a second user input; determining a second user location in the multidimensional sound space based on the second user input; and playing a stereophonic sound associated with the first node based on the second user location, the first node location, and the stereo transition threshold.

A method, apparatus, non-transitory computer readable medium, and system for navigating a multidimensional sound space are described. One or more aspects of the method, apparatus, non-transitory computer readable medium, and system include identifying a plurality of audio sources; arranging a plurality of nodes respectively corresponding to the plurality of audio sources in a grid structure within a multidimensional sound space, wherein the grid structure is based on a tessellation pattern; receiving a user input, wherein the first user input comprises a navigational input of a user with respect to the multidimensional sound space; determining a user location in the multidimensional sound space based on the user input; determining a distance between the user location and a node of the grid structure; and playing a binaural sound associated with the node based on the distance.

An apparatus, system, and method for navigating a multidimensional sound space are described. One or more aspects of the apparatus, system, and method include a user interface configured to identify a first user input and a second user input; a navigation component configured to determine a first user location in a multidimensional sound space based on the first user input and to determine a second user location in the multidimensional sound space based on the second user input, wherein the multidimensional sound space includes a plurality of nodes associated with a plurality of audio sources, respectively; a binaural component configured to play a binaural sound based on a first distance between the first user location and a first node in the multidimensional sound space, wherein the binaural sound is based at least in part on a first audio source associated with the first node; and a stereophonic component configured to play a stereophonic sound based on a second distance between the second user location and the first node in the multidimensional sound space, wherein the stereophonic sound is based at least in part on the first audio source.

DETAILED DESCRIPTION

Figure 1:
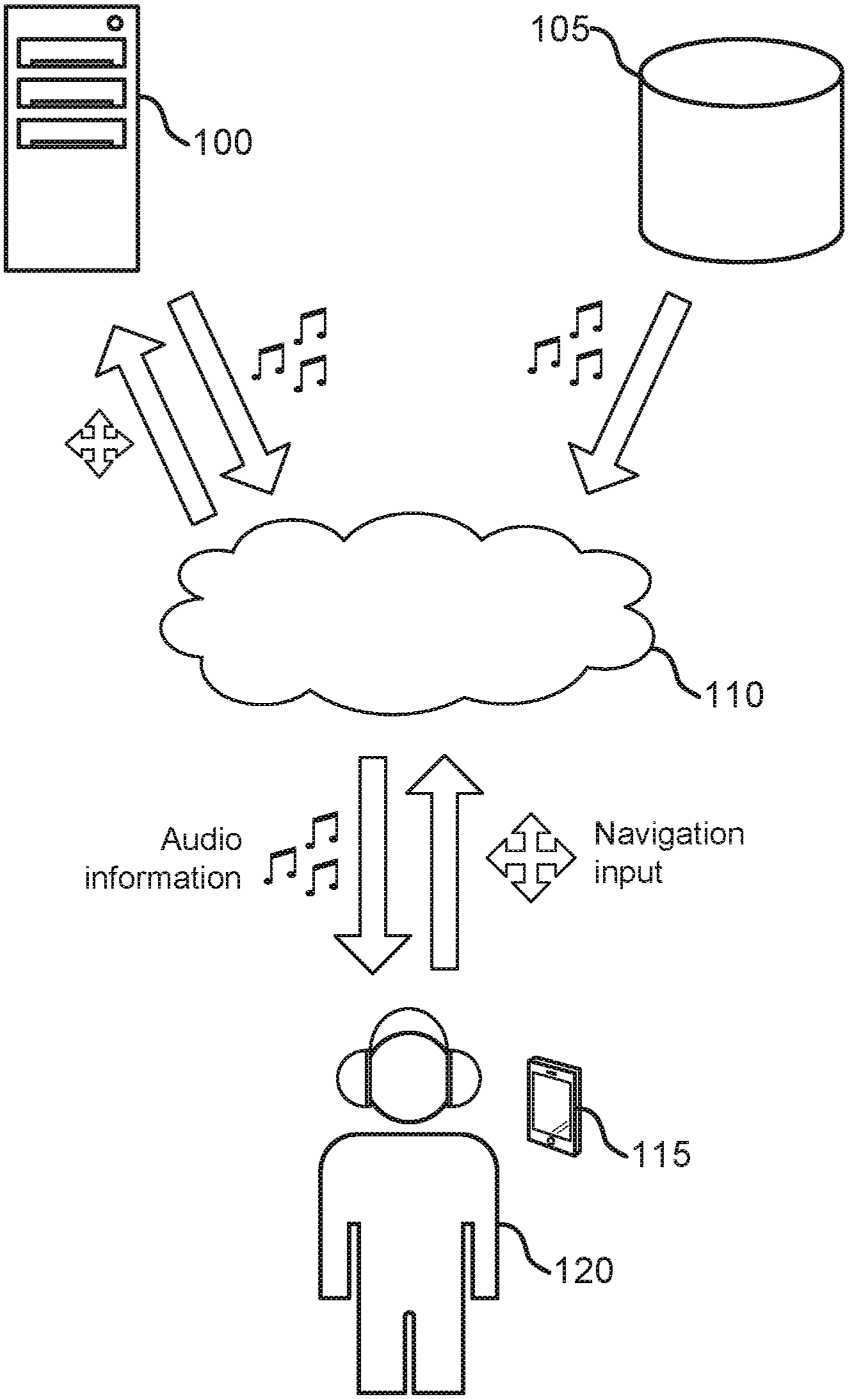
FIG. 1 shows an example of a sound space exploration system according to aspects of the present disclosure.

The present disclosure relates to systems and methods for exploring a multidimensional sound space. Conventional systems for exploring catalogues of music typically use a graphical user interface (GUI). The GUI can be supplemented with audio data; for example, it may play a snippet of the audio if the user has highlighted the song for a period of time. However, this method only allows a user to listen to one audio source at a time. This is a relatively inefficient way to navigate through a collection of audio.

Further, menus can inhibit visually impaired users. Visually impaired users often experience strain and exhaustion using these interfaces. While unimpaired users may rely on labels to provide some context for their listening experience, impaired users can feel a lack of overall direction when attempting to discover new music, as they cannot easily rely on the labeled menus.

To address these issues, embodiments of the present invention provide sonic feedback to allow the user to navigate different sounds, such as musical pieces, within a multidimensional sound space. Some embodiments provide a touch interface, wherein the user swipes up and down to move forwards and backwards, and swipes to either side to turn. In an example, a user can navigate the space without having to directly look at their device. This allows visually or motor impaired users to listen to and discover music without the associated difficulties of using a typical GUI. Further, some embodiments include systems to allow several users to explore the multidimensional sound space, and allow one user to act as a leader and direct followers to new music.

Sound Space Exploration System

An apparatus for navigating a multidimensional sound space is described. One or more aspects of the apparatus include a user interface configured to identify a first user input and a second user input; a navigation component configured to determine a first user location in a multidimensional sound space based on the first user input and to determine a second user location in the multidimensional sound space based on the second user input, wherein the multidimensional sound space includes a plurality of nodes associated with a plurality of audio sources, respectively; a binaural component configured to play a binaural sound based on a first distance between the first user location and a first node in the multidimensional sound space, wherein the binaural sound is based at least in part on a first audio source associated with the first node; and a stereophonic component configured to play a stereophonic sound based on a second distance between the second user location and the first node in the multidimensional sound space, wherein the stereophonic sound is based at least in part on the first audio source.

Some examples of the apparatus, system, and method further include a mapping component configured to map the plurality of audio sources to the plurality of nodes based on features representing the plurality of audio sources. Some examples of the apparatus, system, and method further include a learning component configured to generate the features based on user interactions with the plurality of audio sources.

FIG. 1 shows an example of a sound space exploration system according to aspects of the present disclosure. The example shown includes sound space exploration apparatus 100, database 105, network 110, user interface 115, and user 120.

In some embodiments of the present disclosure, sound space exploration apparatus 100 arranges nodes in a multidimensional sound space for user 120 to explore. In one embodiment, space exploration apparatus 100 pulls information from database 105 to instantiate and arrange the nodes in a multidimensional sound space. The information can be audio information, metadata information, user information, and the like. In some cases, information may be additionally loaded from a memory of sound space exploration apparatus 100. Sound space exploration apparatus 100 then arranges nodes based on the information. In an embodiment, user 120 interacts with user interface 115 to provide navigation input to sound space exploration apparatus 100, and sound space exploration apparatus 100 provides a response to user 120, for example using network 110. Sound space exploration apparatus 100 can be implemented on a server, on a user device, or on a combination thereof, and may include front-end and back-end components.

In some examples, all of or portions of sound space exploration apparatus 100 are implemented on a server. A server provides one or more functions to users 120 linked by way of one or more of the various networks 110. In some cases, the server includes a single microprocessor board, which includes a microprocessor responsible for controlling all aspects of the server. In some cases, a server uses microprocessor and protocols to exchange data with other devices/users 120 on one or more of the networks 110 via hypertext transfer protocol (HTTP), hypertext transfer protocol secure (HTTPS), and simple mail transfer protocol (SMTP), although other protocols and connections such as file transfer protocol (FTP), simple network management protocol (SNMP), user datagram protocol (UDP), transmission control protocol (TCP), and WebSocket may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

A database 105 is an organized collection of data. For example, database 105 stores data in a specified format known as a schema. A database may be structured as a single database, a distributed database, multiple distributed databases, or an emergency backup database. In some cases, a database controller may manage data storage and processing in a database. In some cases, a user interacts with the database controller. In other cases, the database controller operates automatically without user interaction.

In some cases, network 110 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet, such as to user 120. Some large networks have functions distributed over multiple locations from central servers. A server is designated an edge server if it has a direct or close connection to a user, in some cases, a cloud is limited to a single organization. In other examples, the cloud is available to many organizations. In one example, a cloud includes a multi layer communications network comprising multiple edge routers and core routers. In another example, a cloud is based on a local collection of switches in a single physical location.

User interface 115 may be provided through a user device. A user device may be a mobile phone, personal computer, laptop computer, mainframe computer, palmtop computer, personal assistant, mobile device, or any other suitable processing apparatus. In some examples, the user device includes software that allows user 120 to provide navigational input to sound space exploration apparatus 100. In some cases, the user device implements both user interface 115 and sound space exploration apparatus 100.

In some examples, sound space exploration apparatus 100 selects an audio processing mode for each node in the multidimensional sound space. In an illustrative example, the multidimensional sound space includes a first node and a second node. According to some aspects, sound space exploration apparatus 100 selects a stereophonic mode of the first node based on a determination that a first distance, which is a distance between the user and the first node, is less than a stereo transition threshold. In embodiments, the stereo transition threshold is a fixed length from the user regardless of the user's position in the multidimensional sound space. Based on this determination, sound space exploration apparatus 100 plays a stereophonic sound (e.g., a sound with stereophonic audio). In some examples, sound space exploration apparatus 100 selects a binaural mode of the first node based on the determination that a first distance from the user to the node is greater than a stereo transition threshold, and a binaural sound (e.g., sound with binaural processing applied to it) is played based on the binaural mode selection.

According to some aspects, user interface 115 receives a first user input, where the first user input includes a navigational input of a user 120 with respect to the multidimensional sound space, and where the multidimensional sound space includes a set of nodes associated with a set of audio sources, respectively. In some examples, user interface 115 receives a second user input. In some examples, user interface 115 identifies a user interaction with a touch screen, where the first user input includes the user interaction with the touch screen.

Figure 2:
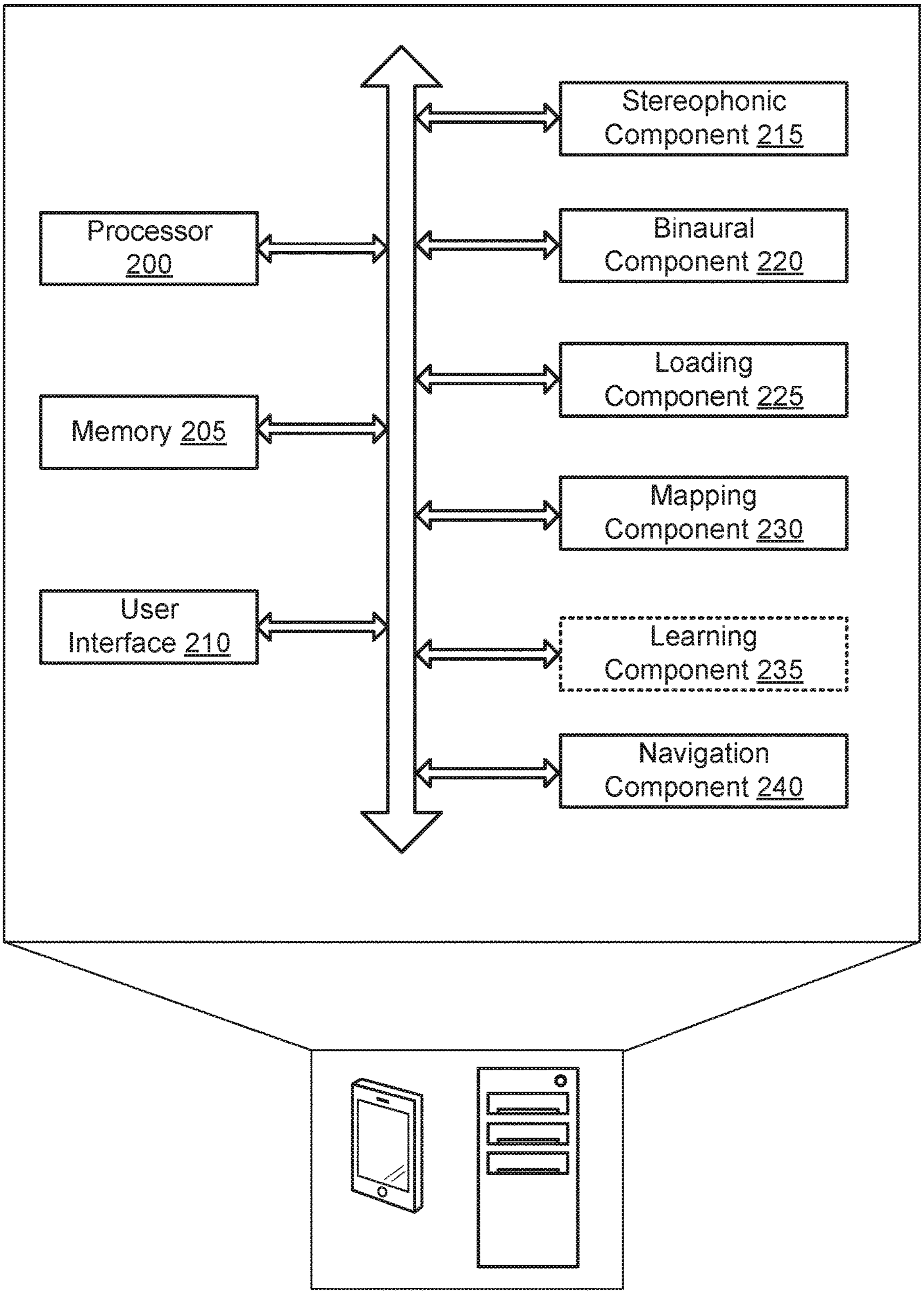
FIG. 2 shows an example of a sound space exploration apparatus according to aspects of the present disclosure.

FIG. 2 shows an example of a sound space exploration apparatus according to aspects of the present disclosure. The example shown includes processor 200, memory 205, user interface 210, stereophonic component 215, binaural component 220, loading component 225, mapping component 230, learning component 235, and navigation component 240.

As discussed above, sound space exploration apparatus can be implemented entirely on a server, entirely on a user device, or in some combination thereof. For example, sound space exploration apparatus may include a server which pulls audio data information from a database and receives input from a user device. A server portion of the sound space exploration apparatus may receive navigational input from a user device portion of the sound space exploration apparatus, generate metadata or preference information, and store the information to memory 205. In some examples, the server portion receives audio data information from the database and also stores it in memory 205.

Processor 200 includes one or more processors. For example, processor 200 may include one or more processors from a server portion and from a user device portion of the sound space exploration apparatus. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor 200 is configured to operate a memory array (e.g., memory 205) using a memory controller. In other cases, a memory controller is integrated into processor 200. In some cases, processor 200 is configured to execute computer-readable instructions stored in memory 205 to perform various functions. In some embodiments, processor 200 includes special purpose components for modem processing, baseband processing, digital signal processing, or transmission processing. In some embodiments, processor 200 implements stereophonic component 215, binaural component 220, loading component 225, mapping component 230, learning component 235, navigational component 240, or a combination thereof. In other embodiments, these components are implemented in separate circuits, or in separate devices other than the sound space exploration apparatus.

Memory 205 may include one or more memory devices. Examples of a memory device include random access memory (RAM), read-only memory (ROM), or a hard disk. Examples of memory devices include solid state memory and a hard disk drive. In some examples, memory 205 is used to store computer-readable, computer-executable software including instructions that, when executed, cause processor 200 to perform various functions described herein. In some cases, memory 205 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory 205 store information in the form of a logical state.

The sound space exploration apparatus includes user interface 210. In embodiments wherein the sound space exploration apparatus includes a server component and a user device component, the user interface 210 may be implemented in the user device component. A user interface may enable a user to interact with a device. In some embodiments, user interface 210 includes an audio device, such as an external speaker system, an external display device such as a display screen, or an input device (e.g., remote control device interfaced with user interface 210 directly or through an IO controller module). The audio device may be connected to a port of user interface 210, such as an analog headphones port. Or, the audio device of user interface 210 may be connected to the sound space exploration apparatus using a wireless protocol. In some cases, user interface 210 includes some GUI elements. The GUI elements shown may be configurable by the user. User interface 210 is an example of, or includes aspects of, the corresponding element described with reference to FIG. 1.

Some of the above mentioned components, such as mapping component 230 or learning component 235, may include a neural network. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying, values for the inputs, and modifying edge weights and activation functions (algorithmically or randomly) until the result closely approximates a set of desired outputs.

Some embodiments including the neural network may further include a model for reinforcement learning. Reinforcement learning is one of three basic machine learning paradigms, alongside supervised learning and unsupervised learning. Specifically, reinforcement learning relates to how software agents make decisions to maximize a reward. The decision making model may be referred to as a policy. This type of learning differs from supervised, learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

According to some aspects, stereophonic component 215 implements stereo sound processing. In some cases, an audio source associated with an audio node includes stereo audio information. In one example, the stereo audio information includes two channels, and each channel is played into each side of a user's headset or earbuds. According to some aspects, stereophonic component 215 plays a stereophonic sound associated with a first node based on a user location, the first node location, and the stereo transition threshold. In some examples, stereophonic component 215 plays the stereophonic sound to a remote user linked to a primary user, based on a location of the remote user.

According to some aspects, binaural component 220 implements binaural processing. Binaural audio refers to audio that has been processed or recorded in a way so as to create the sensation of being present in the original environment of the audio when it is played back to a user. According to some aspects, binaural component 220 plays a binaural sound associated with a first node based on a first user location, a first node location of the first node, and a stereo transition threshold. In some examples, binaural component 220 generates the binaural sound from the first node based on a head related transfer function (HRTF). In some examples, binaural component 220 plays the binaural sound to the remote user based on the first user location.

According to some aspects, binaural component 220 is configured to play a binaural sound based on a first distance between the first user location and a first node in the multidimensional sound space, wherein the binaural sound is based at least in part on a first audio source associated with the first node.

According to some aspects, loading component 225 handles the loading of audio data corresponding to an audio node. Loading component 225 may receive positional data of one or more users, and load audio data from memory 205 or from a database based on the positional data. To some aspects, loading component 225 loads an audio source associated with the second node based on a determination that a distance from the user to a node is less than the loading transition threshold.

According to some aspects, mapping component 230 handles the placement of nodes in the multidimensional sound space. In some examples, mapping component 230 places the nodes corresponding to a set of audio sources. According to some aspects, mapping component 230 identifies features associated with each of the set of audio sources. In some examples, mapping component 230 maps the set of audio sources to the set of nodes in the multidimensional sound space based on the features.

In some examples, mapping component 230 identifies a hierarchical arrangement of the set of audio sources. In some examples, mapping component 230 maps the set of audio sources to the set of nodes, where the set of audio sources are mapped to the first plane and the second plane based on the hierarchical arrangement. In some examples, mapping component 230 maps a first audio source of the set of audio sources to a first node in a first plane of the multidimensional sound space based on the hierarchical arrangement. In some examples, mapping component 230 maps a second audio source of the set of audio sources to a second node in a second plane of the multidimensional sound space based on the hierarchical arrangement.

In some examples, mapping component 230 arranges a set of nodes respectively corresponding to the set of audio sources in a grid structure within a multidimensional sound space, where the grid structure is based on a tessellation pattern. In some aspects, the grid structure includes a rectangular grid, a hexagonal grid, or a triangular grid, though the present disclosure is not limited to these patterns.

According to some aspects, learning component 235 monitors user activity within the multidimensional sound space. Learning component 235 may include a neural network model which implements reinforcement learning. In one embodiment, learning component 235 trains a model according to user activity, and may reward the model when a user quickly finds music they enjoy listening to (as determined by the time spent near a node) in the current arrangement of nodes. In some embodiments, learning component 235 may apply a loss to the model when the user doesn't find any music they enjoy in the current arrangement of nodes. Learning component 235 may further associate the user's activity with features from the audio sources. According to some aspects, learning component 235 monitors interactions with at least one of the set of audio sources, where the features used by mapping component 230 are based on the user interactions.

According to some aspects, navigation component 240 tracks the movement of the user through the multidimensional sound space. For example, in some embodiments, navigation component 240 determines a first user location in the multidimensional sound space based on a first user input, and determines a second user location in the multidimensional sound space based on a second user input. In some examples, navigation component 240 selects a node closest to the first user location from the set of nodes in the multidimensional sound space, and sets the closest node as a first node.

In some examples, navigation component 240 computes a first distance based on the first user location and the first node's location. In some examples, navigation component 240 determines the first distance is within a stereo transition threshold, greater than a stereo transition threshold and less than a binaural transition threshold, greater than a binaural transition threshold and less than a loading transition threshold, or greater than a loading transition threshold. In some examples, navigation component 240 transitions the user from a first plane of the multidimensional sound space to a second plane of the multidimensional sound space based on a user input.

In some examples, navigation component 240 transmits the first user location to a remote user. In some examples, navigation component 240 determines that a local user has a leader role with respect to the remote user, where the first user location is transmitted to the remote user based on the leader role.

Accordingly, navigation component 240 may handle the positions of one or more users, and measure their distances with respect to nodes in the multidimensional sound space. Navigation component 240 may further provide this information to other components within the sound space exploration apparatus and system.

Multidimensional Sound Space

Figure 3:
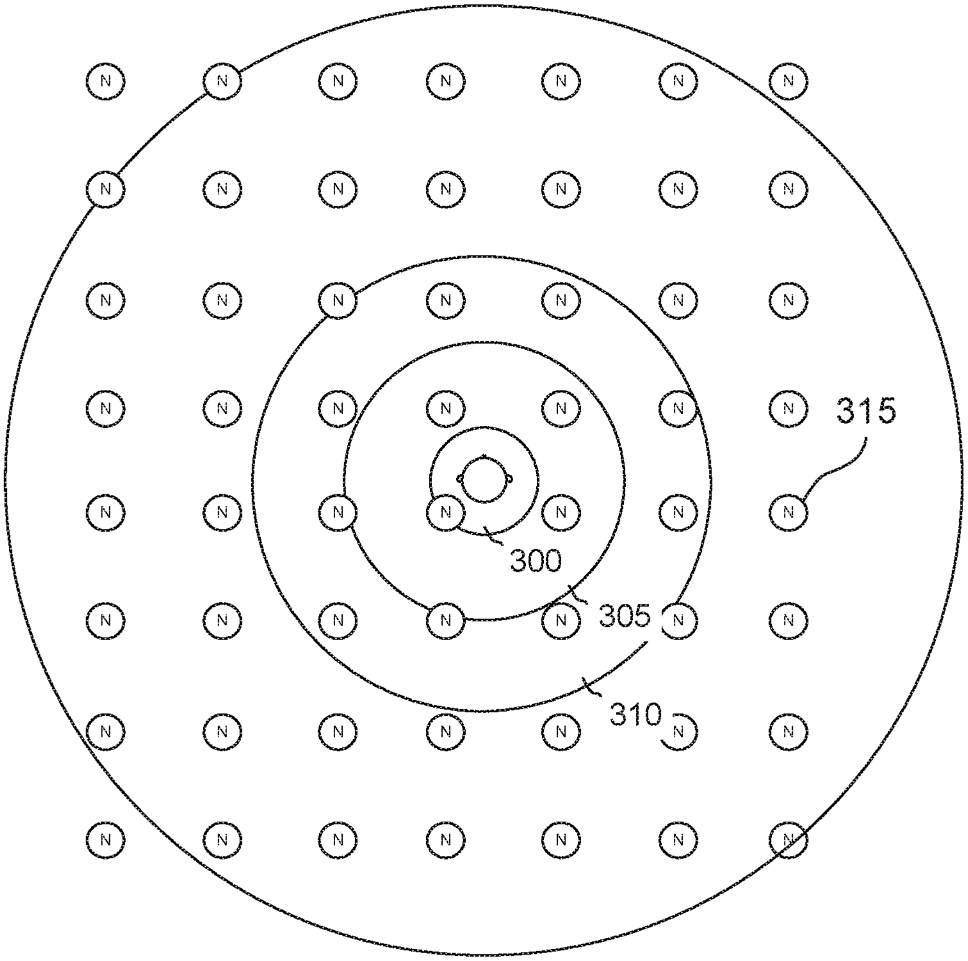
FIG. 3 shows an example of a multidimensional sound space according to aspects of the present disclosure.

FIG. 3 shows an example of a multidimensional sound, space according to aspects of the present disclosure. The example shown includes stereo region 300, binaural region 305, load region 310, and nodes 315.

As discussed with reference to FIG. 2, audio processing may be applied to nodes 315 according to their distance from a user. In an example, stereo region 300 is defined as a constant distance (i.e., a stereo transition threshold) around a user. If a node is within stereo region 300, a stereo component may apply stereo processing to the corresponding audio source of the node, and the user will experience stereo sound from the node. In at least one embodiment, the nodes 315 may be arranged such that only one mode is able to fit within stereo region 300, but the present disclosure is not limited thereto.

Binaural region 305 is defined as a range of distances from the user. In one example, binaural region 305 is defined as a distance between a stereo transition threshold and binaural transition threshold, forming a donut or annulus shape around the user. If a node is within binaural region 305, the node may have binaural applied to its corresponding audio source, and the user may experience binaural audio from the one or more nodes 315 within the binaural region 305. In some embodiments, a binaural component applies an HRTF to the nodes 315 within binaural region 305, thereby providing positional audio relative to the user's position and orientation.

When a node transits from the binaural region to the stereo region, its volume may change according to a gain attenuation curve. In some embodiments, the gain attenuation curve varies inversely with decreasing distance between the user and a node. In some embodiments, the gain attenuation curve is customizable, or has several available presets. In at least one embodiment, when a node transits from region 305 to stereo region 300, the audio smoothly transitions from 100% binaural processing to 100% stereo processing over a predetermined amount of time.

In one embodiment, the amount of gain applied to an audio node is calculated according to the following equation:

$$\text{Gain} = \frac{(1.0 - [(\text{Distance to user}) - (\text{Stereo Threshold})])^{Rolloff}}{(\text{Binaural Threshold} - \text{Stereo Threshold})} \qquad (1)$$

In one embodiment, rolloff is an adjustable value between 1.0 and 4.0. In one embodiment, the binaural transition threshold from the user is 0.5. In some embodiments, when a node is within the stereo transition threshold, the gain is set to 1.0.

Load region 310 is also defined as a range of distances from the user. In one example, load region 310 is defined as a distance between a binaural transition threshold and a load threshold, forming a donut or annulus shape around the user (e.g., with greater radii than the annulus shape of binaural region 305). If a node is within load region 310, the audio source associated with the node may be loaded into a memory. For example, a load component may load the audio source into the memory in anticipation of the user's movement, so that stereo or binaural processing may be quickly applied to the audio source as the user moves towards the nodes. In some embodiments, the loading operation includes streaming the audio source from a server or database. For example, the streaming operation may include downloading portions of the audio from a server or database, storing the portions in a memory of the sound space exploration apparatus, and reconstructing the portions for playback and further processing as described above.

Figure 4:
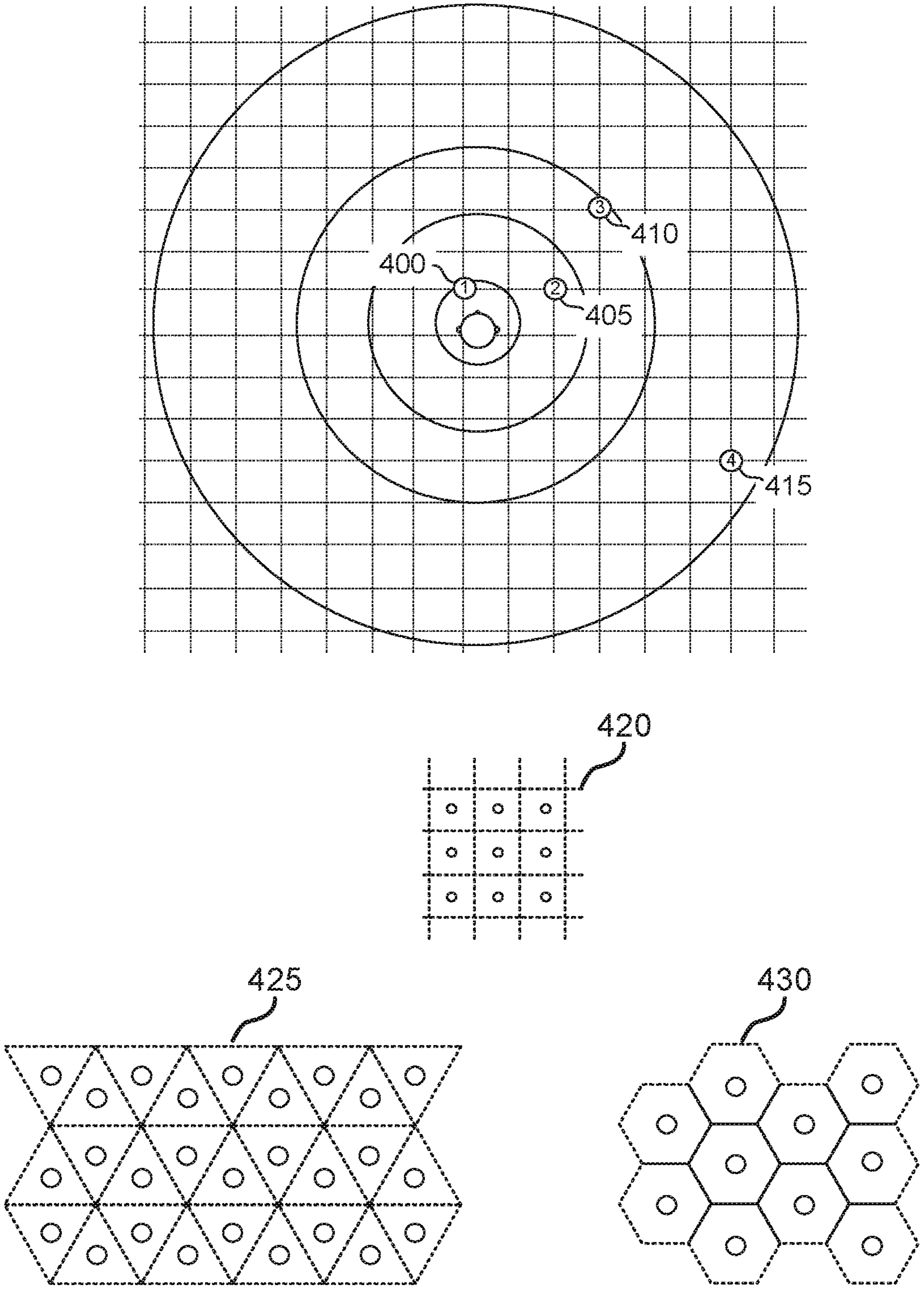
FIG. 4 shows an example of a grid including nodes placed in different regions according to aspects of the present disclosure.

FIG. 4 shows an example of a grid including nodes placed in different regions according to aspects of the present disclosure. The example shown includes first node 400, second node 405, third node 410, fourth node 415, first grid structure 420, second grid structure 425, and third grid structure 430. The circular regions in the grid correspond to the stereo region, binaural region, and load region as described with reference to FIG. 3.

First node 400 may be in a stereo region with respect to a user. For example, first node 400 may correspond to a first audio source that includes stereo audio. In this case, a stereophonic component such as the one described with reference to FIG. 2 handles processing audio from the first node. Accordingly, stereophonic audio corresponding to the first audio source is played back to the user. In some cases, this audio may be reproduced as the loudest or most prominent audio. In at least one embodiment, a learning component such as the one described with reference to FIG. 2 may update parameters based on the user's time in proximity to first node 400.

Second node 405 may be in a binaural region with respect to the user. Second node 405 may correspond to a second audio source. In an example, a binaural component such as the one described with reference to FIG. 2 may apply binaural audio processing to the second audio source. The binaural audio processing may include applying an HRTF to the audio, where the HRTF receives the user's position and orientation with respect to the second node.

Third node 410 many be in a load region with respect to the user. In an example, third node 410 corresponds to a third audio source, and a loading component such as the one described with reference to FIG. 2 may load the third audio source into a memory. In an embodiment, the memory is located within the sound space exploration apparatus.

FIG. 3 illustrates nodes in a rectangular grid pattern comprising rows and columns. However, the nodes may be arranged in various ways. Referring to FIG. 4, for example, the nodes may be arranged according to a tessellation pattern of geometric shapes. First grid structure 420 includes a rectangular grid shape, similar to FIG. 3. Second grid structure 425 includes a triangular grid shape. Third grid structure 430 includes a hexagonal grid shape. The present disclosure is not limited thereto, however, and the grid structures may include rhomboid tessellated shapes, parallelogram tessellated shapes, and the like. In some cases, the nodes may be arranged in the vertices of the tessellated shapes. In some cases, the nodes can be arranged in the centers of the tessellated shapes.

Figure 5:
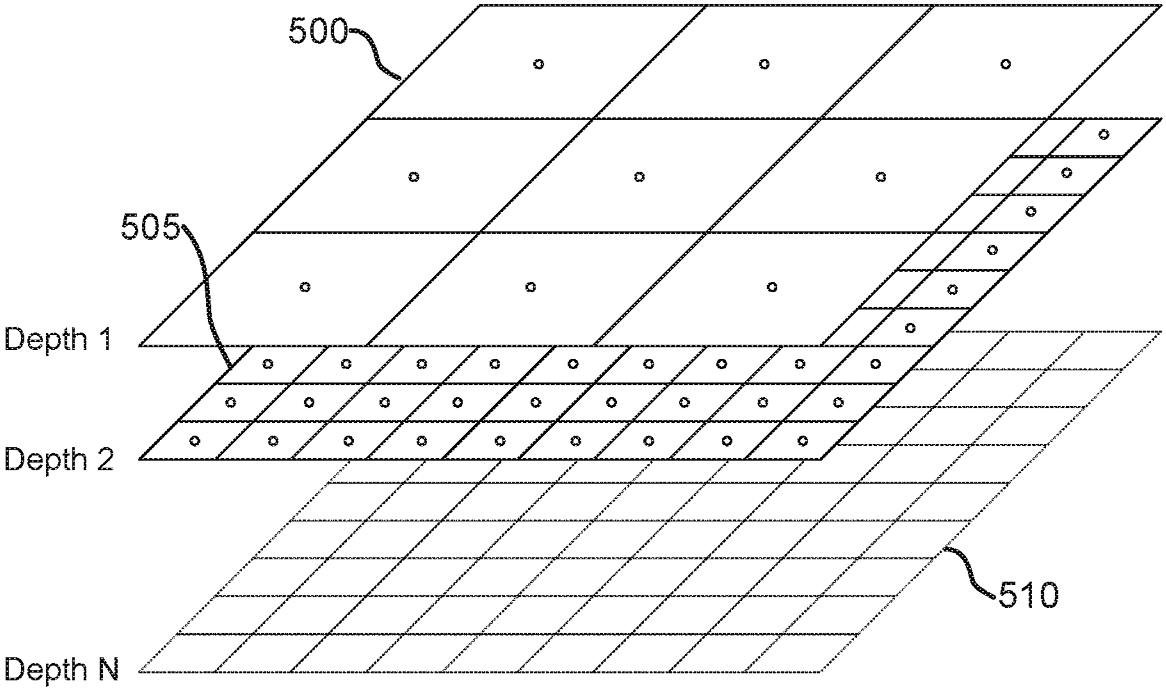
FIG. 5 shows an example of a view of different depth levels in the multidimensional sound space according to aspects of the present disclosure.

FIG. 5 shows an example of a view of different depth levels in the multidimensional sound space according to aspects of the present disclosure. The example shown includes first depth 500, second depth 505, and Nth depth 510.

In some embodiments, a mapping component such as the one described with reference to FIG. 2 arranges the nodes into two or more depth levels. For example, the nodes may be arranged according to metadata associated with the node. In one embodiment, first depth 500 (e.g., a parent depth) may include a node that is representative of children nodes included in second depth 505 beneath it. For example, the parent node may include audio information that has been frequently listened to by the user, or that a learning component predicts would be salient to the user. In another example, the parent node includes audio information that is representative of a set of music, such as a genre, an artist's discography, an album, or the like. This relationship may be recursed to produce additional depth levels. In some embodiments, the user may provide an input to the sound space exploration apparatus to descend or ascend the levels.

Figure 6:
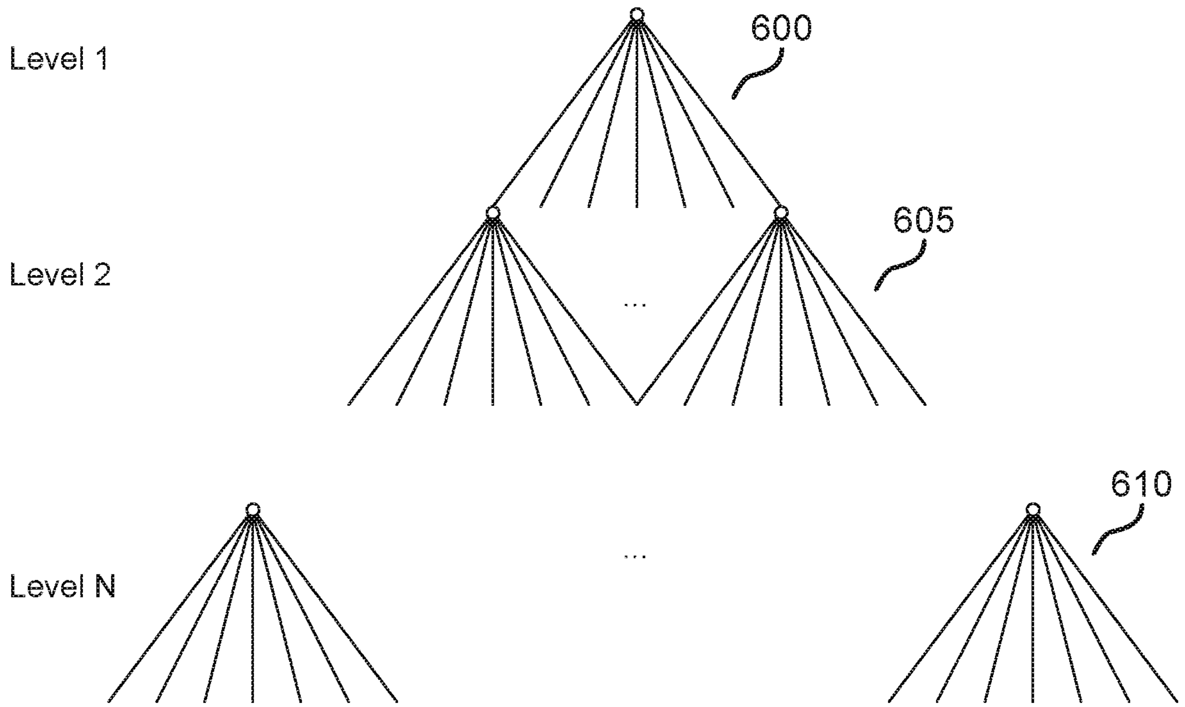
FIG. 6 shows an example of a node hierarchy according to aspects of the present disclosure.

FIG. 6 shows an example of a node hierarchy according to aspects of the present disclosure. The example shown includes level 1 600, level 2 605, and level N 610.

A mapping component, such as the one described with reference to FIG. 2, may be used to generate a node hierarchy. In some embodiments, the node hierarchy contains the same information as the multiple different depth levels described above, and one may be used to construct the other. Level 1 600, for example, may include representative nodes of children nodes contained in level 2 605. In another example, nodes from level N−1 may be representative of children nodes in level N 610.

The "representative" nodes may be nodes that are closest to a certain metric or category. In one example, the audio information for each node is encoded to produce audio features. Then, these audio features are used in a distance calculation for the chosen category. The node with the corresponding features closest to a centroid for that category may be chosen as the parent node. In at least one embodiment, the parent nodes or other nodes may be chosen by a user. In one embodiment, the nodes may be arranged according to metadata.

In some embodiments, the nodes are arranged according to a clustering algorithm. For example, nodes closest to a certain metric or category may be chosen to generate M nodes. The M nodes are then arranged on a level in the multidimensional sound space to fit a grid arrangement. In at least one embodiment, the nodes are arranged compactly, so that there are no blank spaces in between nodes on the grid.

In some embodiments, the clustering algorithm is constrained to choose a predetermined number of nodes. For example, if the nodes for a given depth level or cluster are chosen according to a distance calculation, then the algorithm may dynamically adjust its conditions to include or reject "edge" nodes to meet the predetermined number. In an example, the algorithm may increase its distance threshold to include additional nodes, or decrease its distance threshold to reject nodes. In this context, "distance" may refer to an n-dimensional Euclidean distance between two n-dimensional encodings of audio information, and does not necessarily refer to the same space as the multidimensional sound space.

Clustering, Navigation, and Audio Processing

Figure 7:
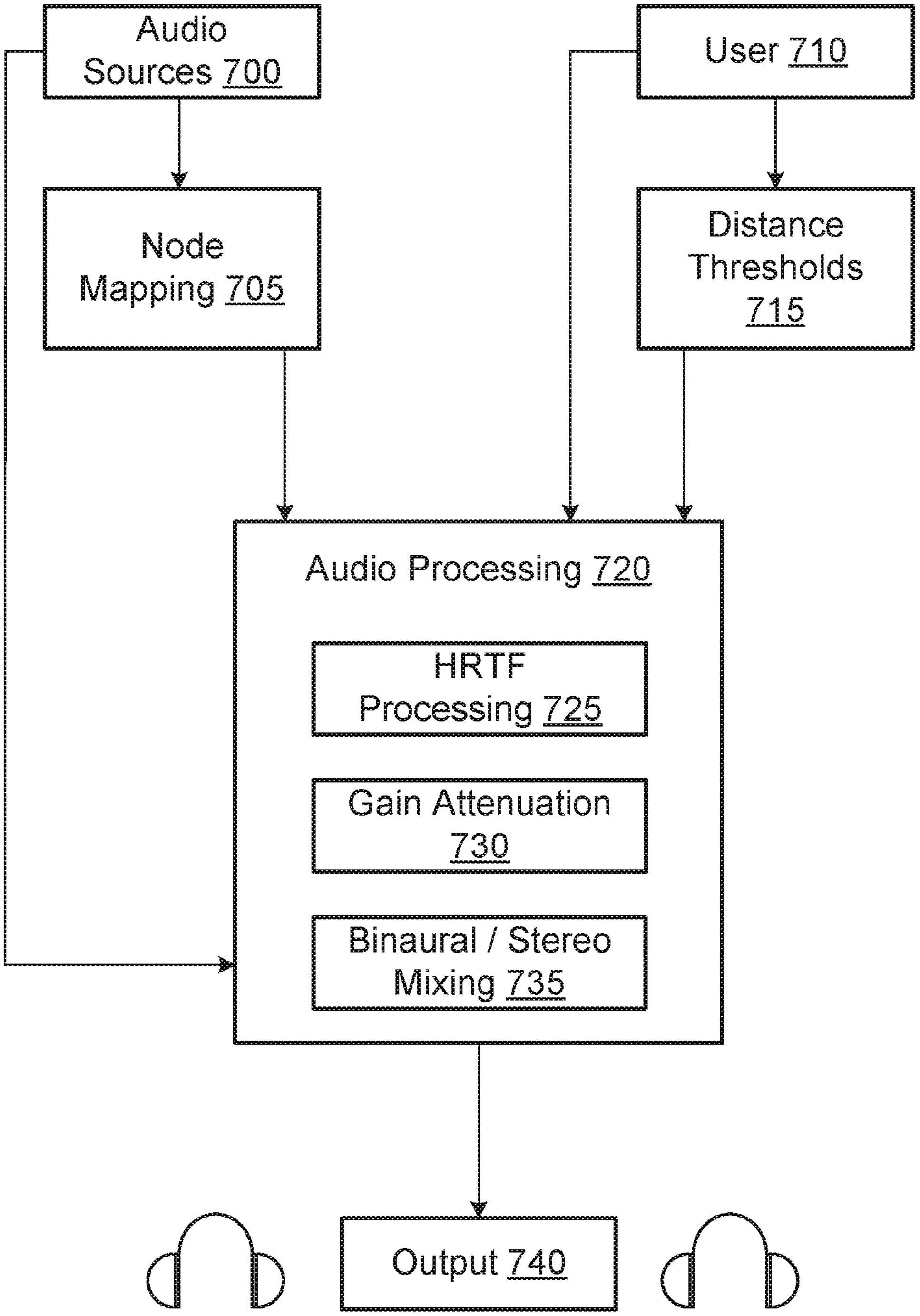
FIG. 7 shows an example of an audio processing pipeline according to aspects of the present disclosure.

FIG. 7 shows an example of audio processing 720 pipeline according to aspects of the present disclosure. The example shown includes audio sources 700, node mapping 705, user 710, distance thresholds 715, audio processing 720, and output 740.

The sound space exploration apparatus, such as the one described with references to FIGS. 1 and 2, may receive audio sources 700 from a database and positional information from user 710. Then, a mapping component such as the one described with reference to FIG. 2 may create and arrange a plurality of nodes according to information from audio sources 700. For example, during node mapping operation 705, the mapping component may utilize preferences, audio features, or other information to generate clusters of nodes and a hierarchy of the nodes. Distance thresholds 715 may be predetermined, or configured by user 710. Information from audio sources 700, the arrangement of nodes from node mapping 705, the position and orientation of user 710, and the distances thresholds 715 including the stereo transition threshold, binaural transition threshold, and loading transition threshold are all applied to audio processing operation 720. In one aspect, audio processing 720 includes HRTF processing 725, gain attenuation 730, and binaural/stereo mixing 735.

A head-related transfer function (HRTF) describes how sounds behave as they pass through space and the various shapes of a listener's head to reach the ears. For example, the size and shape of the head can transform the sound and affect how it is perceived. An HRTF may boost some frequencies and reduce others, and may implement an interaural time difference between left and right channels. In some cases, two HRTFs are used to process audio for each ear to synthesize a binaural sound that appears to emit from a certain location in space. In one embodiment, HRTF processing 725 combines multiple channels from one audio source into mono audio, and then applies HRTFs to the mono audio to generate two streams of audio from a node for each ear. In another embodiment, HRTF processing 725 applies HRTFs to each channel of audio included in audio sources 700.

Gain attenuation 730 adjusts the gain of audio sources 700 based on their distance from user 710. The attenuation is based on the distance between the user and the node. In some embodiments, the relationship between the attenuation and the distance is described by Equation 1. Further, in some embodiments, there is no attenuation applied when the node is within the stereo transition threshold; e.g., the gain is set to 1.0.

Binaural/stereo mixing 735 mixes between binaural and stereo effects when a node transits across the stereo transition threshold. In some embodiments, when a node transits from the binaural region to the stereo region, the audio processing ramps from 100% binaural and 0% stereo to 100% stereo and 0% binaural over a predetermined time. This predetermined time may be referred to as a ramp time. Similarly, when the node transits from the stereo region to the binaural region, the audio processing may ramp from 100% stereo and 0% binaural to 100% binaural and 0% stereo over the ramp time. In at least one embodiment, binaural/stereo mixing 735 is based on a continuous distance between the user and a node, rather than a threshold distance. For example, the audio processing may adjust the mix of stereo and binaural based on the distance, and might not use a ramp time.

Finally, output 740 provides the audio to the sound space exploration apparatus. For example, output 740 may provide the audio to a speaker or headset portion of a user interface of the space exploration apparatus. In this way, the space exploration apparatus provides sonic feedback to a user, thereby facilitating their exploration of the multidimensional sound space.

Figure 8:
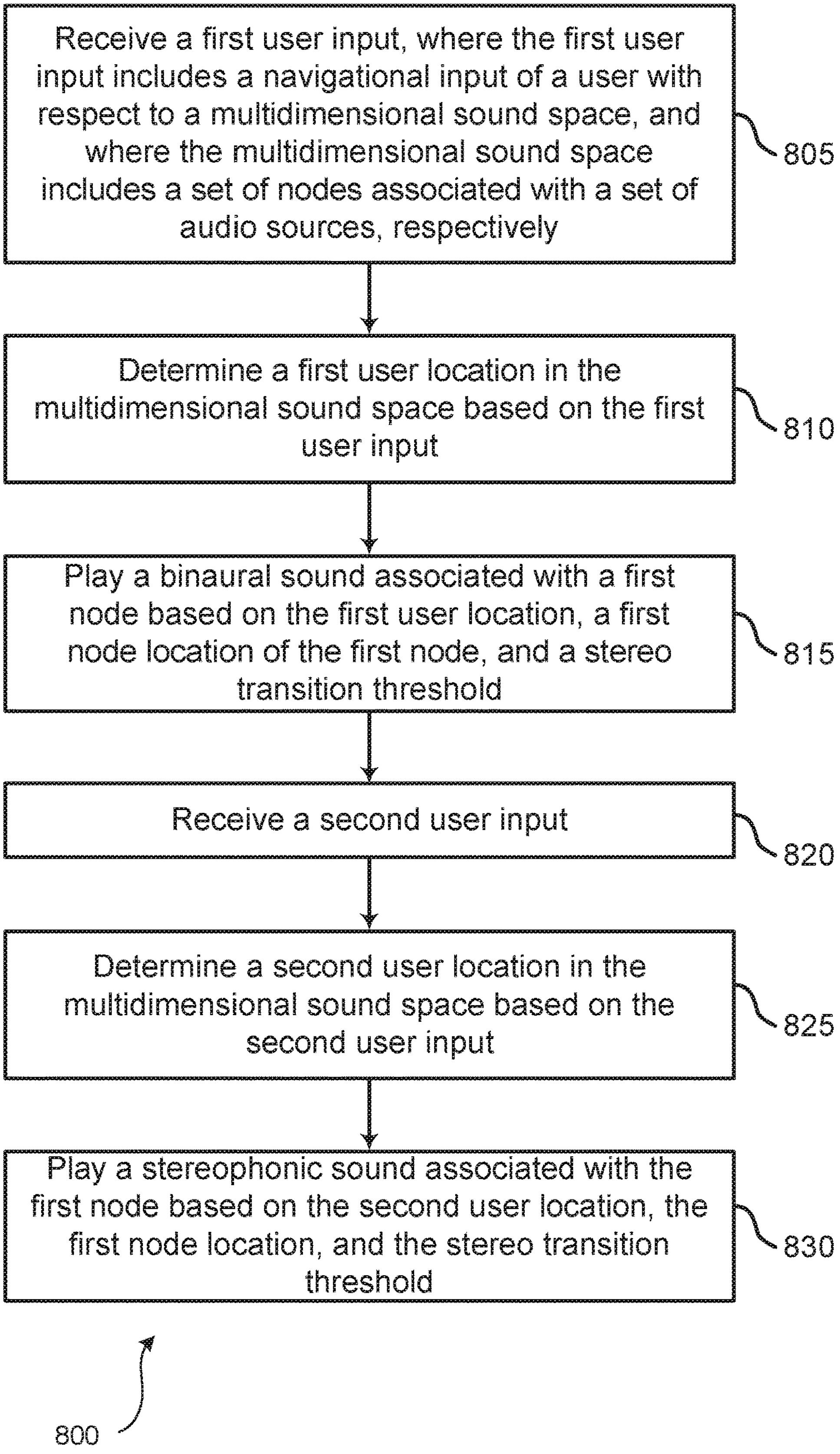
FIG. 8 is an example of a method for navigating a sound space according to aspects of the present disclosure.

FIG. 8 is all example of a method 800 for navigating a sound space according to aspects of the present disclosure. In some examples, these operations are performed by a system including as processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a first user input, where the first user input includes a navigational input of a user with respect to a multidimensional sound space, and where the multidimensional sound space includes a set of nodes associated with a set of audio sources, respectively. In some cases, the operations of this step refer to, or may be performed by, a user interface as described with reference to FIGS. 1 and 2. In some embodiments, the first user input includes a swipe up or a swipe down gesture. In an example, a swipe down gesture moves the user forward in their current direction within the multidimensional sound space. In another example, the swipe down gesture moves the user backwards with respect to their current direction in the multidimensional sound space.

In some embodiments, the first user input includes a swipe from left to right or right to left. In some aspects, a swipe from left to right adjusts the current direction of the user towards the right, and vice versa. In some aspects, a swipe from right to left adjusts the current direction of the user towards the right and vice versa.

However, the first user input is not necessarily limited towards swiping gestures, and can include any form of user input. For example, the first user input may use a voice command, an externally attached input device, a measured acceleration or tilt of the space exploration apparatus, or the like.

At operation 810, the system determines a first user location in the multidimensional sound space based on the first user input. For example, the system may instantiate an initial user position, and then update the user position based on the first user input. In some cases, the operations of this step refer to, or may be performed by, a navigation component as described with reference to FIG. 2.

At operation 815, the system plays a binaural sound associated with a first node based on the first user location, a first node location of the first node, and a stereo transition threshold. For example, the system may apply audio processing to an audio source associated with the first node as described with reference to FIG. 7. The audio processing for the binaural sound may include one or more HRTFs. The audio processing may further include gain attenuation. In some cases, the operations of this step refer to, or may be perforated by, a binaural component as described with reference to FIG. 2.

At operation 820, the system receives a second user input. In some cases, the operations of this step refer to, or may be performed by, a user interface as described with reference to FIGS. 1 and 2. At operation 825, the system determines a second user location in the multidimensional sound space based on the second user input. In some cases, the operations of this step refer to, or may be performed by, a navigation component as described with reference to FIG. 2.

At operation 830, the system plays a stereophonic sound associated with the first node based on the second user location (e.g., a second location of the first user, or a location of a second user), the first node location, and the stereo transition threshold. For example, the system may apply audio processing to an audio source associated with the first node as described with reference to FIG. 7. In the case of stereophonic sound, the system may play unprocessed or minimally processed audio from the audio source associated with the first node. In some cases, the operations of this step refer to, or may be performed by, a stereophonic component as described with reference to FIG. 2.

Figure 9:
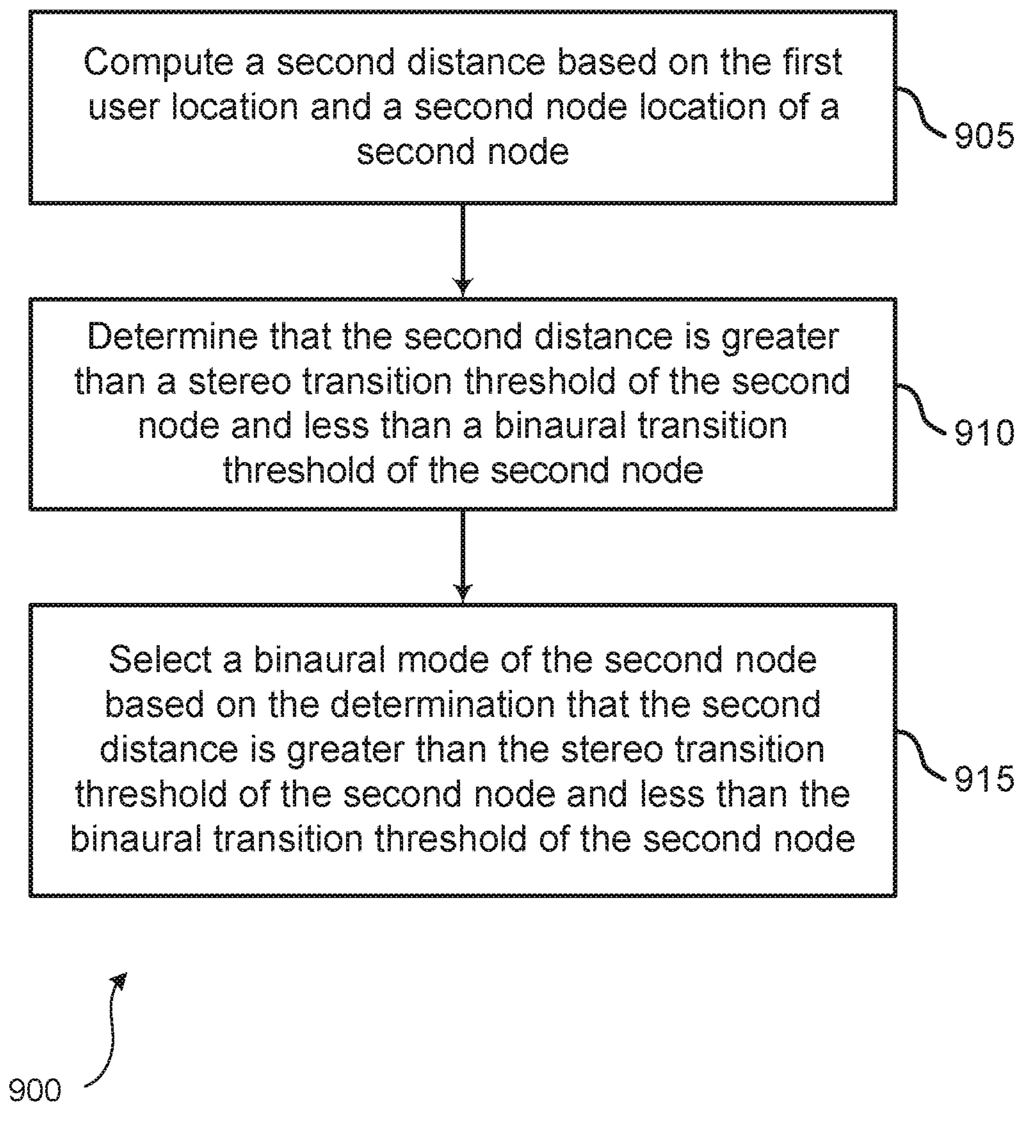
FIG. 9 is an example of a method for navigating a virtual space according to aspects of the present disclosure.

FIG. 9 is an example of a method 900 for navigating a virtual space according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

FIG. 9 describes navigating the virtual space, and determining either a stereophonic or binaural mode for a given node based on its distance from the user. At operation 905, the system computes a second distance based on the first user location and a second node location of a second node. In some cases, the operations of this step refer to, or may be performed by, a navigation component as described with reference to FIG. 2.

At operation 910, the system determines that the second distance is greater than a stereo transition threshold of the second node and less than a binaural transition threshold of the second node. For example, the second distance may lie within the binaural region as described with reference to FIG. 3. In some cases, the operations of this step refer to, or may be performed by, a navigation component as described with reference to FIG. 2.

At operation 915, the system selects a binaural mode of the second node based on the determination that the second distance is greater than the stereo transition threshold of the second node and less than the binaural transition threshold of the second node. In some cases, the operations of this step refer to, or may be performed by, a sound space exploration apparatus as described with reference to FIG. 1.

Figure 10:
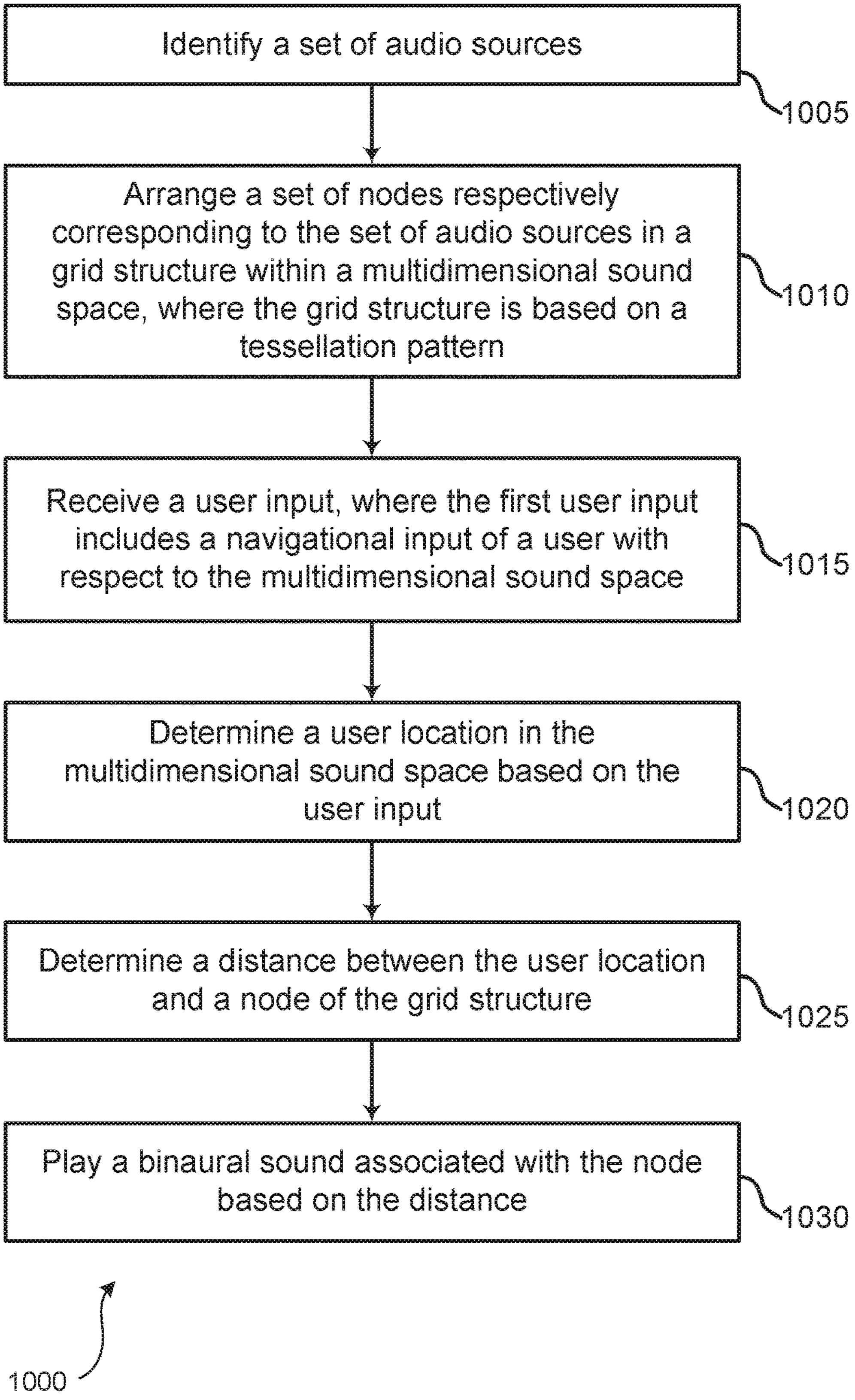
FIG. 10 is an example of a method for arranging nodes in a multidimensional sound space and playing sounds based on the nodes according to aspects of the present disclosure.

FIG. 10 is an example of a method 1000 for arranging nodes in a multidimensional sound space and playing sounds based on the nodes according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies a set of audio sources. The audio sources may be in a database as a part of the sound space exploration system, or otherwise identified in a memory. In some cases, the operations of this step refer to, or may be performed by, a mapping component as described with reference to FIG. 2.

At operation 1010, the system arranges a set of nodes respectively corresponding to the set of audio sources in a grid structure within a multidimensional sound space, where the grid structure is based on a tessellation pattern. The grid structure can conform to any tessellation pattern, such as the ones described with reference to FIG. 4.

At operation 1015, the system receives a user input, where the first user input includes a navigational input of a user with respect to the multidimensional sound space. In some cases, the operations of this step refer to, or may be performed by, a user interface as described with reference to FIGS. 1 and 2. At operation 1020, the system determines a user location in the multidimensional sound space based on the user input. In some cases, the operations of this step refer to, or may be performed by, a navigation component as described with reference to FIG. 2.

At operation 1025, the system determines a distance between the user location and a node of the grid structure. In some cases, the operations of this step refer to, or may be performed by, a navigation component as described with reference to FIG. 2.

At operation 1030, the system plays a binaural sound associated with the node based on the distance. For example, the node may be positioned past a stereo transition threshold and within a binaural transition threshold. In this case, the node is within the binaural region, as described with reference to FIG. 3. Then, binaural processing, HRTF, and attenuation may be applied to audio associated with the node. In some cases, the operations of this step refer to, or may be performed by, a binaural component as described with reference to FIG. 2.

Figure 11:
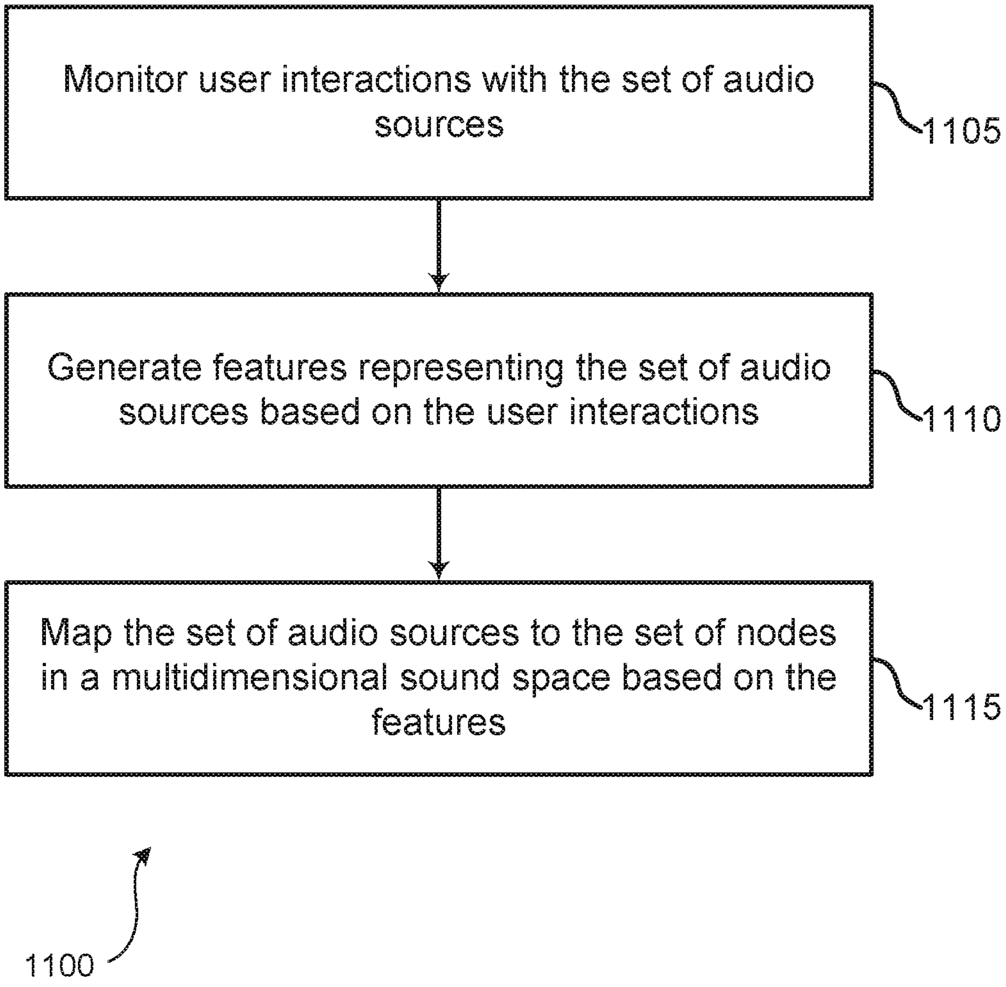
FIG. 11 is an example of a method for arranging nodes in the multidimensional sound space according to aspects of the present disclosure.

FIG. 11 is an example of a method 1100 for arranging nodes in the multidimensional sound space according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

FIG. 11 describes a technique for arranging the nodes based on features. At operation 1105, the system monitors user interactions with the set of audio sources. In some cases, the operations of this step refer to, or may be performed by, a learning component as described with reference to FIG. 2.

At operation 1110, the system generates features representing the set of audio sources based on the user interactions. In some cases, the operations of this step refer to, or may be performed by, a learning component as described with reference to FIG. 2. For example, the system may cluster the nodes as described with reference to FIG. 7. In some embodiments, the system may a generate plurality of clusters in a plurality of depth levels in the multidimensional sound space.

In some embodiments, the nodes are arranged based on the audio information. For example, the clusters may be based on audio features extracted from audio sources by a mapping component as described with reference to FIG. 2. In some cases, the nodes may be grouped based on how close the audio features for each node are to a centroid in an n-dimensional space. The centroid mays represent an "average" of features for a category.

At operation 1115, the system maps the set of audio sources to the set of nodes in a multidimensional sound space based on the features. In some cases, the operations of this step refer to, or may be performed by, a mapping component as described with reference to FIG. 2.

Accordingly, the present disclosure includes the following aspects.

A method for navigating a multidimensional sound space is described. One or more aspects of the method include receiving a first user input, wherein the first user input comprises a navigational input of a user with respect to a multidimensional sound space, and wherein the multidimensional sound space includes a plurality of nodes associated with a plurality of audio sources, respectively; determining a first user location in the multidimensional sound space based on the first user input; playing a binaural sound associated with a first node based on the first user location, a first node location of the first node, and a stereo transition threshold; receiving a second user input; determining a second user location in the multidimensional sound space based on the second user input; and playing a stereophonic sound associated with the first node based on the second user location, the first node location, and the stereo transition threshold.

Some examples of the method, apparatus, non-transitory computer readable medium, and system further include identifying a user interaction with a touch screen, wherein the first user input comprises the user interaction with the touch screen.

Some examples of the method, apparatus, non-transitory computer readable medium, and system further include identifying a touch location on the touch screen based on the user interaction, wherein the first user location in the multidimensional sound space is computed based on the touch location.

Some examples of the method, apparatus, non-transitory computer readable medium, and system further include selecting a node closest to the first user location from the plurality of nodes, wherein the first node comprises the closest node.

Some examples of the method, apparatus, non-transitory computer readable medium, and system further include computing a first distance based on the first user location and the first node location. Some examples further include determining that the first distance is greater than a stereo transition threshold of the first node. Some examples further include selecting a binaural mode of the first node based on the determination that the first distance is greater than the stereo transition threshold of the first node, wherein the binaural sound is played based on the binaural mode.

Some examples of the method, apparatus, non-transitory computer readable medium, and system further include computing a second distance based on the first user location and a second node location of a second node. Some examples further include determining that the second distance is greater than a stereo transition threshold of the second node and less than a binaural transition threshold of the second node. Some examples further include selecting a binaural mode of the second node based on the determination that the second distance is greater than the stereo transition threshold of the second node and less than the binaural transition threshold of the second node.

Some examples of the method, apparatus, non-transitory computer readable medium, and system further include computing a third distance based on the second user location and the first node location. Some examples further include determining that the third distance is less than a stereo transition threshold of the first node. Some examples further include selecting a stereophonic mode of the first node based on the determination that the third distance is less than the stereo transition threshold of the first node, wherein the stereophonic sound is played based on the stereophonic mode.

Some examples of the method, apparatus, non-transitory computer readable medium, and system further include receiving a third user input. Some examples further include determining a third user location in the multidimensional sound space based on the third user input. Some examples further include computing a third distance based on the third user location and a second node location of a second node. Some examples further include determining that the third distance is less than a loading transition threshold of the second node. Some examples further include loading an audio source associated with the second node based on the determination that the third distance is less than the loading transition threshold.

Some examples of the method, apparatus, non-transitory computer readable medium, and system further include generating the binaural sound from the first node based on a Head Related Transfer Function (HRTF).

Some examples of the method, apparatus, non-transitory computer readable medium, and system further include identifying features associated with each of the plurality of audio sources. Some examples further include mapping the plurality of audio sources to the plurality of nodes in the multidimensional sound space based on the features.

Some examples of the method, apparatus, non-transitory computer readable medium, and system further include monitoring user interactions with at least one of the plurality of audio sources, wherein the features are based at least in part on the user interactions.

Some examples of the method, apparatus, non-transitory computer readable medium, and system further include receiving a third user input. Some examples further include transitioning from a first plane of the multidimensional sound space to a second plane of the multidimensional sound space based on the third user input.

Some examples of the method, apparatus, non-transitory computer readable medium, and system further include identifying a hierarchical arrangement of the plurality of audio sources. Some examples further include mapping the plurality or audio sources to the plurality of nodes, wherein the plurality of audio sources are mapped to the first plane and the second plane based on the hierarchical arrangement.

Some examples of the method, apparatus, non-transitory computer readable medium, and system further include transmitting the first user location to a remote user. Some examples further include playing the binaural sound to the remote user based on the first user location. Some examples further include transmitting the second user location to the remote user. Some examples further include playing the stereophonic sound to the remote user based on the second user location. Some examples of the method, apparatus, non-transitory computer readable medium, and system further include determining that a local user has a leader role with respect to the remote user, wherein the first user location is transmitted to the remote user based on the leader role.

A method for navigating a multidimensional sound space is described. One or more aspects of the method include identifying a plurality of audio sources: arranging a plurality of nodes respectively corresponding to the plurality of audio sources in a grid structure within a multidimensional sound space, wherein the grid structure is based on a tessellation pattern; receiving a user input, wherein the first user input comprises a navigational input of a user with respect to the multidimensional sound space: determining a user location in the multidimensional sound space based on the user input; determining a distance between the user location and a node of the grid structure: and playing a binaural sound associated with the node based on the distance. In some aspects, the grid structure comprises a rectangular grid, a hexagonal grid, or a triangular grid.

Some examples of the method, apparatus, non-transitory computer readable medium, and system further include monitoring user interactions with the plurality of audio sources. Some examples further include generating features representing the plurality of audio sources based on the user interactions. Some examples further include mapping the plurality of audio sources to the plurality of nodes in a multidimensional sound space based on the features. Some examples further include identifying a location in the multidimensional sound space. Some examples further include identifying a node of the plurality of nodes based on the location. Some examples further include playing a sound based on an audio source associated with the node.

Some examples of the method, apparatus, non-transitory computer readable medium, and system further include generating a hierarchical arrangement of the plurality of audio sources. Some examples further include mapping a first audio source of the plurality of audio sources to a first node in a first plane of the multidimensional sound space based on the hierarchical arrangement. Some examples further include mapping a second audio source of the plurality of audio sources to a second node in a second plane of the multidimensional sound space based on the hierarchical arrangement.

The description and drawings described herein represent example configurations and do not represent all the implementations within the scope of the claims. For example, the operations and steps may be rearranged, combined or otherwise modified. Also, structures and devices may he represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for navigating a virtual space, comprising:
receiving a first user input, wherein the first user input comprises a navigational input of a user with respect to a multidimensional sound space, and wherein the multidimensional sound space includes a plurality of nodes associated with a plurality of audio sources, respectively;
determining a first user location in the multidimensional sound space based on the first user input;
playing a binaural sound associated with a first node based on the first user location, a first node location of the first node, and a stereo transition threshold;
receiving a second user input;
determining a second user location in the multidimensional sound space based on the second user input; and
playing a stereophonic sound associated with the first node based on the second user location, the first node location, and the stereo transition threshold,
wherein the method further comprises:
computing a first distance based on the first user location and the first node location;
determining that the first distance is greater than a stereo transition threshold of the first node; and
selecting a binaural mode of the first node based on the determination that the first distance is greater than the stereo transition threshold of the first node, wherein the binaural sound is played based on the binaural mode.

2. The method of claim 1, further comprising:
identifying a user interaction with a touch screen, wherein the first user input comprises the user interaction with the touch screen.

3. The method of claim 2, further comprising:
identifying a touch location on the touch screen based on the user interaction, wherein the first user location in the multidimensional sound space is computed based on the touch location.

4. The method of claim 1, further comprising;
selecting a node closest to the first user location from the plurality of nodes, wherein the first node comprises the closest node.

5. The method of claim 1, further comprising:
computing a second distance based on the first user location and a second node location of a second node;
determining that the second distance is greater than a stereo transition threshold of the second node and less than a binaural transition threshold of the second node; and
selecting a binaural mode of the second node based on the determination that the second distance is greater than the stereo transition threshold of the second node and less than the binaural transition threshold of the second node.

6. A method for navigating a virtual space, comprising:
receiving a first user input, wherein the first user input comprises a navigational input of a user with respect to the multidimensional sound space, and wherein the multidimensional sound space includes a plurality of nodes associated with a plurality of audio sources, respectively;
determining a first user location in the multidimensional sound space based on the first user input;
playing a binaural sound associated with a first node based on the first user location, a first nodel location of the first node, and a stereo transition threshold;
receiving a second user input;
determining a second user location in the multidimensional sound space based on the second user input; and
playing a stereophonic sound associated with the first node based on the second user location, the first node location, and the stereo transition threshold,
wherein the method further comprises:
computing a third distance based on the second user location and the first node location;
determining that the third distance is less than a stereo transition threshold of the first node; and
selecting a stereophonic mode of the first node based on the determination that the third distance is less than the stereo transition threshold of the first node, wherein the stereophonic sound is played based on the stereophonic mode.

7. The method of claim 1, further comprising:
receiving a third user input;
determining a third user location in the multidimensional sound space based on the third user input;
computing a third distance based an the third user location and a second node location of a second node;
determining that the third distance is less than a loading transition threshold of the second node; and
loading an audio source associated with the second node based on the determination that the third distance is less than the loading transition threshold.

8. The method of claim 1, further comprising:
generating the binaural sound from the first node based on a Head Related Transfer Function (HRTF).

9. The method of claim 1, further comprising:
identifying features associated with each of the plurality of audio sources; and mapping the plurality of audio sources to the plurality of nodes in the multidimensional sound space based on the features.

10. The method of claim 9, further comprising:

monitoring user interactions with at least one of the plurality of audio sources, wherein the features are based at least in part on the user interactions.

11. The method of claim 1, further comprising:

receiving a third user input; and transitioning from a first plane of the multidimensional sound space to a second plane of the multidimensional sound space based on the third user input.

12. The method of claim 11, further comprising:

identifying a hierarchical arrangement of the plurality of audio sources; and mapping the plurality of audio sources to the plurality of nodes, wherein the plurality of audio sources are mapped to the first plane and the second plane based on the hierarchical arrangement.

13. The method of claim 1, further comprising:

transmitting the first user location to a remote user;

playing the binaural sound to the remote user based on the first user location;

transmitting the second user location to the remote user; and playing the stereophonic sound to the remote user based on the second user location.

14. The method of claim 13, further comprising:

determining that a local user has a leader role with respect to the remote user, wherein the first user location is transmitted to the remote user based on the leader role.

15. Apparatus for navigating a virtual space, comprising:

a user interface configured to identify a first user input and a second user input;

a navigation component configured to determine a first user location in a multidimensional sound space based on the first user input and to determine a second user location in the multidimensional sound space based on the second user input, wherein the multidimensional sound space includes a plurality of nodes associated with a plurality of audio sources, respectively;

a binaural component configured to play a binaural sound based on a first distance between the first user location and a first node in the multidimensional sound space, wherein the binaural sound is based at least in part on a first audio source associated with the first node; and a stereophonic component configured to play a stereophonic sound based on a second distance between the second user location and the first node in the multidimensional sound space, wherein the stereophonic sound is based at least in part on the first audio source, wherein the navigation component is configured to compute the first distance and determine that the first distance is greater than a stereo transition threshold of the first node; and wherein the binaural component is configured to select a binaural mode of the first node based on the determination that the first distance is greater than the stereo transition threshold of the first node, wherein the binaural sound is played based on the binaural mode.

16. The apparatus of claim 15, further comprising:

a mapping component configured to map the plurality of audio sources to the plurality of nodes based on features representing the plurality of audio sources.

17. The apparatus of claim 16, further comprising:

a learning component configured to generate the features based on user interactions with the plurality of audio sources.

* * * * *